(12) United States Patent
Sasao et al.

(10) Patent No.: US 11,029,707 B2
(45) Date of Patent: Jun. 8, 2021

(54) MOVING OBJECT, MOVING OBJECT CONTROL METHOD, MOVING OBJECT CONTROL SYSTEM, AND MOVING OBJECT CONTROL PROGRAM

(71) Applicant: SZ DJI TECHNOLOGY CO., LTD., Shenzhen (CN)

(72) Inventors: Yukiyoshi Sasao, Tokyo (JP); Yuji Wada, Tokyo (JP)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 141 days.

(21) Appl. No.: 16/256,776

(22) Filed: Jan. 24, 2019

(65) Prior Publication Data
US 2019/0171238 A1    Jun. 6, 2019

Related U.S. Application Data

(63) Continuation of application No. PCT/JP2016/072314, filed on Jul. 29, 2016.

(51) Int. Cl.
*G05D 1/10* (2006.01)
*G05D 1/00* (2006.01)
(Continued)

(52) U.S. Cl.
CPC ............ *G05D 1/10* (2013.01); *G05D 1/0044* (2013.01); *G08G 5/006* (2013.01); *G08G 5/0069* (2013.01); *G01C 21/20* (2013.01)

(58) Field of Classification Search
CPC ........ G05D 1/10; G05D 1/0044; G08G 5/006; G08G 5/0069; G01C 21/20
See application file for complete search history.

(56) References Cited

U.S. PATENT DOCUMENTS 9,588,516 B1 * 3/2017 Gurel ...................... G06T 5/002
9,592,912 B1 * 3/2017 Michini ............... G08G 5/0069
(Continued)

FOREIGN PATENT DOCUMENTS

JP    2010160735 A    7/2010
JP    2014040231 A    3/2014

OTHER PUBLICATIONS

Drew Dixon, "Geofencing Stops Drones in Their Tracks", published Aug. 2017, https://www.govtech.com/public-safety/Geofencing-Stops-Drones-in-Their-Tracks.html (Year: 2017).*
(Continued)

*Primary Examiner* — Calvin Cheung
(74) *Attorney, Agent, or Firm* — Anova Law Group, PLLC

(57) ABSTRACT

An information processing device includes a control circuitry configured to acquire first location information obtained based on a positioning process of a terminal, acquire second location information obtained based on a positioning process of a moving object located at a same site as the terminal, calculate difference information between a terminal location indicated by the first location information and a moving-object location indicated by the second location information, acquire third location information obtained based on the positioning process of the terminal after the terminal moves, and set information of a moving range for the moving object based on the third location information and the difference information.

16 Claims, 15 Drawing Sheets

(51) Int. Cl.
  *G08G 5/00*   (2006.01)
  *G01C 21/20*   (2006.01)

(56) References Cited

U.S. PATENT DOCUMENTS 10,762,795 B2 * 9/2020 Contreras .......... H04B 7/18506
2016/0307447 A1 * 10/2016 Johnson ................. B60L 58/12

OTHER PUBLICATIONS

The World Intellectual Property Organization (WIPO) The International Search Report for PCT/JP2016/072314 dated Oct. 18, 2016 3 Pages.
Keiich Inoue et al., Sensor Fusion Techniques for Automatic Guidance by the Method of Kalman Filter Using DGPS and Gyrocompass, Journal of the Japanese Society of Agricultural Machinery, vol. 61, No. 4, pp. 103-113, 1999.
Boris Aronov et al., Polyline Fitting of Planar Points under Min-Sum Criteria, International Journal of Computational Geometry and Applications, 16 (2-3), pp. 97-116, 2006.

\* cited by examiner

MOVING OBJECT, MOVING OBJECT CONTROL METHOD, MOVING OBJECT CONTROL SYSTEM, AND MOVING OBJECT CONTROL PROGRAM

CROSS-REFERENCE TO RELATED APPLICATION

This application is a continuation of International Application No. PCT/JP2016/072314, filed on Jul. 29, 2016, the entire contents of which are incorporated herein by reference.

FIELD

The disclosed embodiments relate to technology for a moving object.

BACKGROUND

In recent years, a technique has been proposed in which a moving object such as an unmanned aerial vehicle (UAV) automatically moves (automatic flight and the like) on a designated path or within a designated region. In general, a UAV has a positioning function using Global Navigation Satellite System (GNSS). A UAV can fly on a designated path based on its own location identified by a positioning process and can fly so as to not depart outside of the designated region. In Inoue Keiich, et al., "Sensor fusion Techniques for Automatic Guidance by the method of Kalman filter using GPS and Gyrocompass", Journal of the Japanese Society of Agricultural Machinery Vol. 61 No. 4, 1999, pp. 103-13, a positioning technique is disclosed using a Global Positioning System (GPS), which is one type of GNSS, and a gyro sensor.

The following two methods, for example, are considered as a method for designating the path the UAV will fly or the range in which flight is allowed. The first method designates the flight path or the range on map data. The second method is to fly the UAV by manual operation and to set the path indicated by the flight log as the path for a subsequent flight, or the boundary of the range in which flight is allowed.

SUMMARY

However, in the first method, for example, when the actual geography is not accurately indicated for reasons such as the map data not being up-to-date, the flight path or range of a UAV cannot be precisely designated. Furthermore, in the second method, since flying a UAV for acquiring the flight log is carried out by a manual operation, it is difficult to precisely fly on the target path.

An object of the present disclosure is to provide a technique for accurately setting a path or range in which a moving object moves.

In one aspect, a moving object can include a first acquisition unit, a second acquisition unit, a calculating unit, a third acquisition unit, and a setting unit. The first acquisition unit can acquire first location information obtained based on a positioning process of a terminal located at a first site. The second acquisition unit can acquire second location information obtained based on a positioning process of a moving object located at the first site. The calculating unit can calculate difference information between a location indicated by the first location information, and a location indicated by the second location information. The third acquisition unit can acquire third location information obtained based on the positioning process of the terminal after moving. The setting unit can set information of a moving range for the moving object based on the third location information and the difference information.

In this aspect, the positioning process of the terminal and the moving object can be respectively carried out at the same site, and the first location information and the second location information can be acquired. The difference information between these locations can be calculated. For example, the third location information can be acquired by moving the terminal along the boundary of the moving range to be set. The moving range of the moving object can be set based on the third location information and the difference information. Thus, the range in which the moving object is allowed to move can be set with high precision.

The moving object can include a control unit for controlling the moving object so as to not exceed the moving range.

The setting unit can set the information of the moving range according to information of a location calculated based on the third location information and the difference information.

The third location information can include information about a plurality of locations, and the setting unit can set the information of the moving range according to the information of the plurality of locations calculated based on the information of the plurality of locations and the difference information.

The setting unit can set the information for the boundary of the moving range by connecting a plurality of locations.

The setting unit can set the information of the moving range so that the moving range is defined inside a region surrounded by connecting a plurality of locations.

The positioning process method of the terminal can be different than the positioning process method of the moving object.

The positioning process method of the terminal can include autonomous navigation.

The positioning process method of the terminal can include positioning using a GNSS.

The positioning process method of the terminal can include positioning using a signal received from a base station or a wireless router.

The difference information can include latitude and longitude information.

The difference information can include vector information.

The terminal can be a mobile phone, a smartphone, a tablet terminal, a laptop, or a navigation device.

The positioning process of the moving object located at the first site can be executed according to a user's instructions.

The third location information can include location information obtained by the positioning process executed at predetermined time intervals in the terminal.

In another aspect, a moving object can include a first acquisition unit, a second acquisition unit, a calculating unit, a third acquisition unit, and a setting unit. The first acquisition unit can acquire first location information obtained based on a positioning process of a terminal located at a first site. The second acquisition unit can acquire second location information obtained based on a positioning process of a moving object located at the first site. The calculating unit can calculate difference information between a location indicated by the first location information, a location indicated by the second location information. The third acquisition unit can acquire third location information obtained based on the positioning process of the terminal after moving. The setting unit can set moving path information based on the third location information and the difference information.

In this aspect, the positioning process of the terminal and the moving object can be respectively carried out at the same site, and the first location information and the second location information can be acquired. The difference information between these locations can be calculated. For example, the third location information can be acquired by moving the terminal along the path of the moving object to be set. The path of the moving object can be set based on the third location information and the difference information. Thus, the path whereon the moving object will move can be set with high precision.

A control unit can be provided for controlling the moving object so as to move on the path.

The setting unit can set the information of the path according to information of a location calculated based on the third location information and the difference information.

The third location information can include information about a plurality of locations. The setting unit can set the information of the path according to the information of the plurality of locations calculated based on the information of the plurality of locations and the difference information.

The setting unit can set the path by connecting a plurality of locations.

In one aspect, an information processing device can include a setting unit. The setting unit can set information of a moving range for a moving object based on third location information and difference information, by acquiring difference information between a location indicated by first location information obtained based on a positioning process of a terminal located at a first site, and a location indicated by second location information obtained based on a positioning process of a moving object located at the first site; and third location information obtained based on the positioning process of the terminal after moving.

In another aspect, an information processing device can include a setting unit. The setting unit can set moving path information based on third location information and difference information, by acquiring difference information between a location indicated by first location information obtained based on a positioning process of a terminal located at a first site, and a location indicated by second location information obtained based on a positioning process of a moving object located at the first site; and third location information obtained based on the positioning process of the terminal after moving.

In one aspect, a moving object control method executed in the moving object can include acquiring first location information, acquiring second location information, calculating difference information, acquiring third location information, and setting information of a moving range for the moving object. The first location information can be obtained based on the positioning process of a terminal located at a first site. The second location information can be obtained based on a positioning process of a moving object located at the first site. The difference information can be located between a location indicated by the first location information, and a location indicated by the second location information. The third location information can be obtained based on the positioning process of the terminal after moving. The information of a moving range for the moving object can be based on the third location information and the difference information.

The moving object control method can include controlling the moving object so as to not exceed the moving range.

The setting can include setting information of the moving range according to information of a location calculated based on the third location information and the difference information.

The third location information can include information about a plurality of locations. The setting can include setting the information of the moving range according to the information of the plurality of locations calculated based on the information of the plurality of locations and the difference information.

The setting can include setting the information for the boundary of the moving range by connecting a plurality of locations.

The setting can include setting the information of the moving range so that the moving range is defined inside a region surrounded by connecting plurality of locations.

In another aspect, a moving object control method executed in the moving object can include acquiring first location information, acquiring second location information, calculating difference information, acquiring third location information, and setting moving path information. The first location information can be obtained based on the positioning process of a terminal located at a first site. The second location information can be obtained based on a positioning process of a moving object located at the first site. The difference information can be located between a location indicated by the first location information, and a location indicated by the second location information. The third location information can be obtained based on the positioning process of the terminal after moving. The moving path information can be based on the third location information and the difference information.

The moving object control method can include controlling the moving object so as to not exceed the path.

The setting can include setting information of the path according to information of a location calculated based on the third location information and the difference information.

The third location information can include information about a plurality of locations. The setting can include setting the information of the path according to the information of the plurality of locations calculated based on the information of the plurality of locations and the difference information.

The setting can include setting the path by connecting a plurality of locations.

In one aspect, an information processing method executed in a computer provided with a control unit, can include acquiring difference information, acquiring third location information, and setting information of a moving range for the moving object, using the control unit. The difference information can be located between a location indicated by the first location information obtained based on a positioning process of a terminal located at a first site, and a location indicated by the second location information obtained based on a positioning process of a moving object located at the first site. The third location information can be obtained based on the positioning process of the terminal after moving. The information of a moving range for the moving object can be based on the third location information and the difference information.

In another aspect, an information processing method executed in a computer provided with a control unit, can include acquiring difference information, acquiring third location information, and setting moving path information, using the control unit. The difference information can be located between a location indicated by the first location information obtained based on a positioning process of a terminal located at a first site, and a location indicated by the second location information obtained based on a positioning process of a moving object located at the first site. The third location information can be obtained based on the positioning process of the terminal after moving. The moving path information can be based on the third location information and the difference information.

In one aspect, a moving object control system can include a moving object and a terminal. The moving object can include a first acquisition unit, a second acquisition unit, a calculating unit, a third acquisition unit, and a setting unit. The first acquisition unit can acquire first location information obtained based on a positioning process by a terminal located at a first site. The second acquisition unit can acquire second location information obtained based on a positioning process by a moving object located at the first site. The calculating unit can calculate difference information between a location indicated by the first location information, and a location indicated by the second location information. The third acquisition unit can acquire third location information obtained based on the positioning process of the terminal after moving. The setting unit can set information of a moving range for the moving object based on the third location information and the difference information.

In another aspect, a moving object control system can include a moving object and a terminal. The moving object can include a first acquisition unit, a second acquisition unit, a calculating unit, a third acquisition unit, and a setting unit. The first acquisition unit can acquire first location information obtained based on a positioning process by a terminal located at a first site. The second acquisition unit can acquire second location information obtained based on a positioning process by a moving object located at the first site. The calculating unit for calculating difference information between a location indicated by the first location information, and a location indicated by the second location information. The third acquisition unit can acquire third location information obtained based on the positioning process of the terminal after moving. The setting unit can set moving path information based on the third location information and the difference information.

In one aspect, a moving object control program can cause a computer to: acquire first location information; acquire second location information; calculate difference information; acquire third location information; and set information of a moving range for the moving object. The first location information can be obtained based on the positioning process of a terminal located at a first site. The second location information can be obtained based on a positioning process of a moving object located at the first site. The difference information can be located between a location indicated by the first location information, and a location indicated by the second location information. The third location information can be obtained based on the positioning process of the terminal after moving. The information of a moving range for the moving object can be based on the third location information and the difference information.

In another aspect, a moving object control program can cause a computer to: acquire first location information; acquire second location information; calculate difference information; acquire third location information; and set moving path information. The first location information can be obtained based on the positioning process of a terminal located at a first site. The second location information can be obtained based on a positioning process of a moving object located at the first site. The difference information can be located between a location indicated by the first location information, and a location indicated by the second location information. The third location information can be obtained based on the positioning process of the terminal after moving. The moving path information can be based on the third location information and the difference information.

In another aspect, a moving object control program can cause a computer to: acquire difference information; acquire third location information; and set information of a moving range for the moving object. The difference information can be located between a location indicated b first location information obtained based on a positioning process of a terminal located at a first site, and a location indicated by the second location information obtained based on a positioning process of a moving object located at the first site. The third location information can be obtained based on the positioning process of the terminal after moving. The information of a moving range for the moving object can be based on the third location information and the difference information.

In another aspect, a moving object control program can cause a computer to: acquire difference information; acquire third location information; and set moving path information. The difference information can be located between a location indicated by the first location information obtained based on a positioning process of a terminal located at a first site, and a location indicated by the second location information obtained based on a positioning process of a moving object located at the first site. The third location information can be obtained based on the positioning process of the terminal after moving. The moving path information can be based on the third location information and the difference information.

The present disclosure is not limited to the above aspects, and various other modifications can be implemented within the scope not deviating from the gist of the present disclosure. That is, the foregoing aspects are merely illustrative in all respects and are not to be construed as limiting, and various modified examples can be used.

The present disclosure can provide a technique for accurately setting the path or the range in which a moving object moves.

DETAILED DESCRIPTION OF THE EMBODIMENTS

Figure 1:
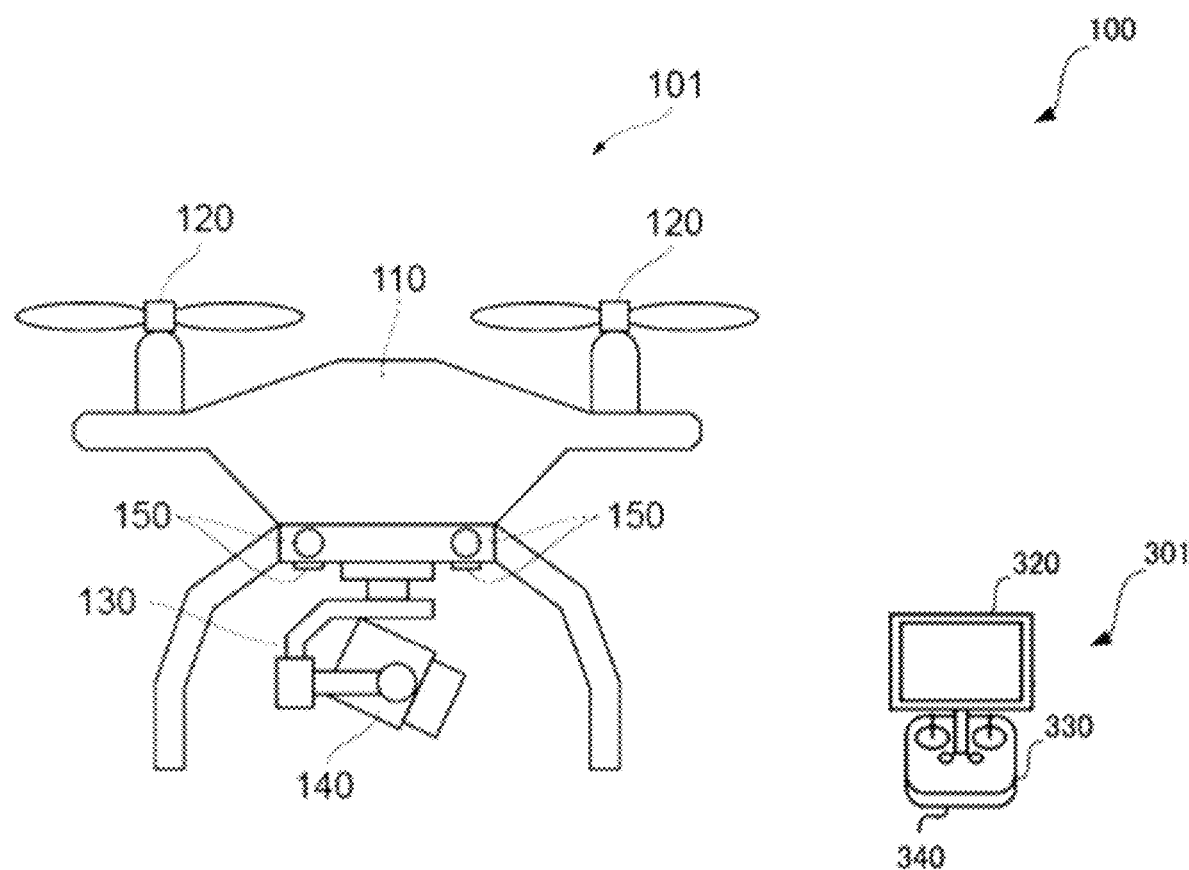
FIG. 1 illustrates one example of an exterior of an unmanned aerial vehicle control system.

The embodiments of the present disclosure are described in detail below with reference to the drawings, Note that the configurations described in the embodiments below are only examples and the present disclosure is not limited to the configurations illustrated in the drawings. Portions of the configurations illustrated in the drawings can be replaced by another configuration.

The claims, specifications, drawings, and abstract contain matters subject to copyright protection. The copyright owner does not object to reproduction by any person of these documents, as long as it appears in the file or record of the Patent Office. However, in all other cases, all copyrights are reserved.

A configuration example of an unmanned aerial vehicle control system is described with reference to FIG. 1, As illustrated in FIG. 1, the unmanned aerial vehicle control system 100 can include an unmanned aerial vehicle (UAV) 101 and a controller 301. The UAV 101 can fly by manual operation from the user via a controller 301, and can fly automatically to fly a preset path. The UAV 101 can include a UAV body 110, a plurality of rotary wings 120, a gimbal 130, an imaging device 140, a camera 150, and the like.

Flight of the UAV 101 can be controlled according to a virtual fence set via the controller 301 and the like. The virtual fence can define the boundary of the range (hereinafter referred to as "flight range") where flight (movement) of the UAV 101 is allowed. When the virtual fence is set, the flight of the UAV 101 can be controlled so as to not cross the virtual fence. For example, the virtual fence can be used when spraying agricultural chemicals so that the UAV 101 flies only in the land of a specific region. In this case, the boundary between the specific region and the region outside the specific region can be set as the virtual fence, and even if the user transmits an instruction via the controller 301 to the UAV 101 to move outside the specific region, the UAV 101 can be controlled so as to not move outside the specific region.

The plurality of rotary wings 120 can cause lift and propulsion for the UAV 101 due to the rotation. Flight of the UAV body 110 can be controlled by controlling the rotation of the plurality of rotary wings 120.

The UAV 101 can have four rotary wings 120. The number of rotary wings 120 is not limited to four and can be set to any number. As a modified example, the UAV 101 can be a UAV having fixed wings rather than rotary wings 120. The UAV 101 can have both rotary wings 120 and fixed wings.

The gimbal 130 can support the imaging device 140 so that the attitude of the imaging device 140 can be changed. The gimbal 130, for example, can adjust the attitude of the imaging device 140 by rotating the imaging device 140 around the central yaw axis, pitch axis and roll axis.

The imaging device 140 can include a lens device, and can generate and record optical image data of a subject captured via the lens device. The image data generated by the imaging device 140 can include still image data and moving image data.

The plurality of cameras 150 can be formed by sensing cameras for controlling the flight of the UAV 101. As illustrated in FIG. 1, for example, two cameras 150 can be provided in the front on the nose of the UAV body 110.

The two cameras 150 can be provided on the bottom surface of the UAV body 110. By using a disparity of the image imaged by the pair of two cameras 150, the distance to an object near the UAV body 110 can be determined. The pair of cameras 150 can be provided on at least one of nose, aft, side surface, bottom surface, and ceiling surface.

The controller 301 can be a remote controller (terminal device) for operating the UAV 101. As such a terminal device, the user can use various types such as a mobile type, or an end type that can be mounted on a carrying body (such as an automobile). A mobile phone, a smartphone, a tablet terminal, a laptop, a navigation device, a dedicated controller device, or the like can be given as a specific example of the terminal device.

The controller 301 can communicate to the UAV 101. The controller 301 can transmit a signal to the UAV 101 and control various operations including flight of the UAV 101. The controller 301 can receive a signal including various information from the UAV 101. The controller 301 can include a display unit 320, an operation unit 330, and a main body 340.

The display unit 320 can be a user interface displaying information of the processing results and images using the controller 301. The display unit 320 can include an arbitrary display means including liquid crystal display.

The operation unit 330 can be a user interface for receiving operation instructions from the user. The operation unit 330, for example, can have a button and joystick type operation member. A touch panel can be used by using the operation unit 330 and the display unit 320 together.

Figure 2:
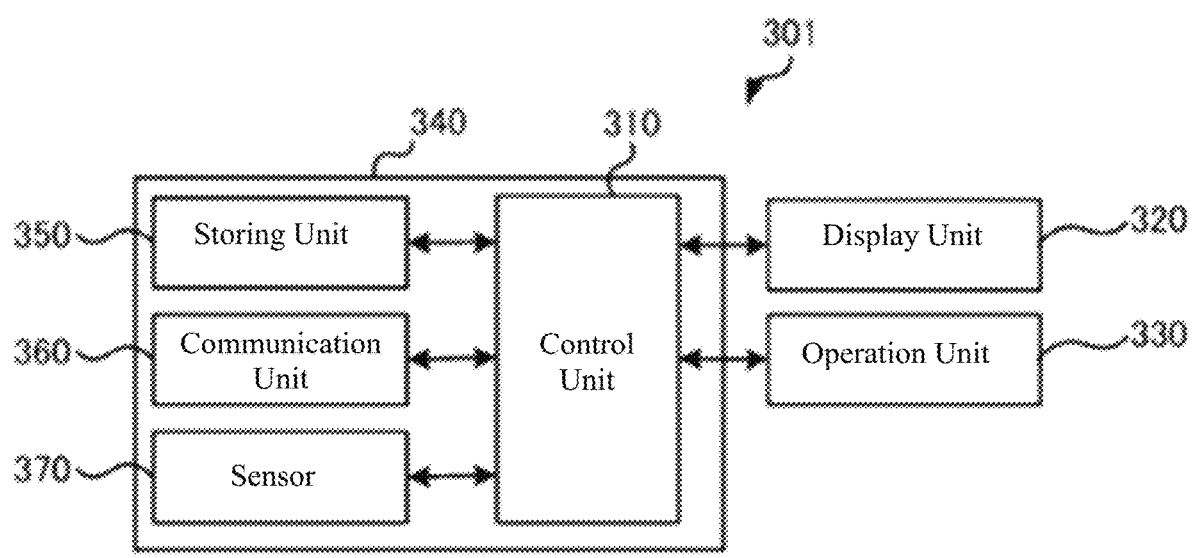
FIG. 2 is a block diagram illustrating one example of a controller hardware configuration.

The hardware configuration is described with reference to FIG. 2. The main body 340 of the controller 301 can include the hardware configuration. The main body 340 can include a control unit 310, storage unit 350, communication unit 360, and sensor 370 as the main components.

The control unit 310 can control the operation of each component provided in the controller 301, and can further control execution of various processes. The control unit 310, for example, can include a central processing unit (CPU) and memory. The control unit 310 can implement various functions by developing and executing the program stored in the storage unit 350 in the memory and by controlling the operation of various components provided in the controller 301. The function implemented by the control unit 310 is described later.

The storage unit 350 can store information for various programs and process results necessary for execution of processes in the controller 301. The storage unit 350 can be configured to include a storage medium such as semiconductor memory.

The communication unit 360 can be a communication interface for communicating with an external device. The communication unit 360, for example, can output the control signal for controlling the operation of the UAV 101. Furthermore, the communication unit 360 can receive a signal from a GNSS satellite used in the positioning process of the UAV 101.

The sensor 370, for example, can include a gyro sensor, acceleration sensor, geomagnetic sensor, image sensor, and the like. The sensor 370, for example, can sense the inclination of the controller 301, the direction in which a predetermined portion of the controller 301 is facing, whether the controller 301 is moving, and the like.

Figure 3:
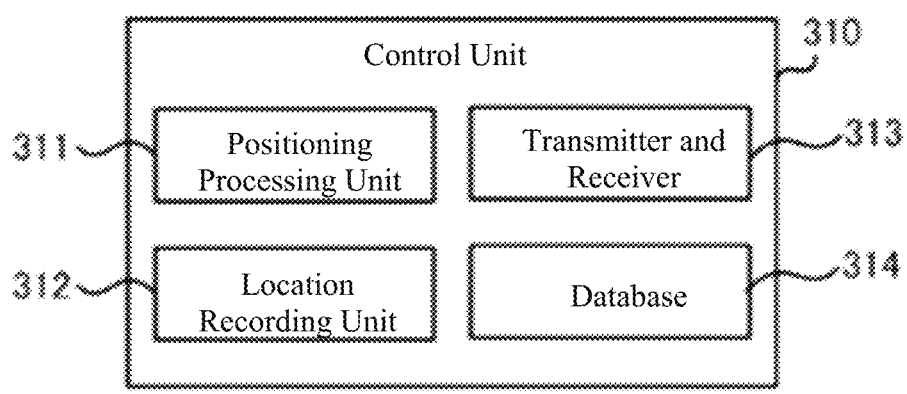
FIG. 3 is a block diagram illustrating one example of a functional configuration for a control unit of a controller.

The function implemented by the control unit 310 in the controller 301 is described with reference to FIG. 3. The control unit 310 can include a positioning processing unit 311, a location recording unit 312, a transmitter and receiver 313, and a database 314 as the components of the main function. Among these functions, for example, the control unit 310 can develop and execute the program stored in the storage unit 350 in the memory, and can be implemented by controlling the operation of each component provided by the controller 301. At least one part of the above-described functions can be implemented by operation of various control circuitry and hardware instead of the program. The control unit 310 can implement another function wherein a general remote controller or a terminal device is provided, but for convenience, a description is omitted here.

The database 314 can store various information such as information necessary for processing in the controller 301, and information generated by the processing.

The positioning processing unit 311 can identify the location of the controller 301 using the positioning process. Any method can be used in the positioning process. For example, the positioning processing unit 311 can identify the location of the controller 301 by executing the positioning process based on a signal from the GNSS satellite received via the communication unit 360. The positioning processing unit 311 can identify the location of the controller 301 by executing the positioning process based on sensing information using the sensor 370 (that is, using autonomous navigation). The positioning processing unit 311 can execute positioning process based on a signal received from a communication device such as a nearby communication router or a base station.

The positioning processing unit 311 can output information of a location of the controller 301 identified by the positioning process and information of a timing of when the location was identified (for example, date and time) as positioning information. The positioning process using the positioning processing unit 311, for example, can be executed at a preset timing (for example, every second), and can be executed based on a user's instructions.

The location recording unit 312 can store the positioning information output by the positioning processing unit 311 in the database 314. The location information included in the positioning information can be identified by latitude and longitude, and can be identified by other coordinate information. The location recording unit 312 can store positioning information in the database 314 each time the positioning process is executed by the positioning processing unit 311, and can store positioning information acquired by one or more positioning processes from among the executed positioning processes in the database 314. For example, the location recording unit 312 can store positioning information in the database 314 every time a predetermined amount of time passes (for example, every 10 seconds), or every time the controller 301 moves a predetermined distance (for example, every time it moves 10 m). The location recording unit 312 can also store positioning information in the database 314 at a timing when instructions are received from a user.

The transmitter and receiver 313 can transmit information and signals to, and receive information and signals from, an external device. For example, the transmitter and receiver 313 can transmit positioning information output by the positioning processing unit 311, or positioning information stored in the database 314 to the UAV 101.

One example of the process flow using the controller 301 is described with reference to FIG. 4. This flow can include a processing for acquiring location information (third location information to be described later) of a controller 301 used to set the flight range (virtual fence) or flight path of the UAV 101. The third location information can be information illustrating the movement trajectory for the controller 301. As described in detail below, the third location information, for example, can be acquired by the controller 301 executing the positioning process when the user is moving while holding the controller 301 on the virtual fence or flight path to be set.

Figure 4:
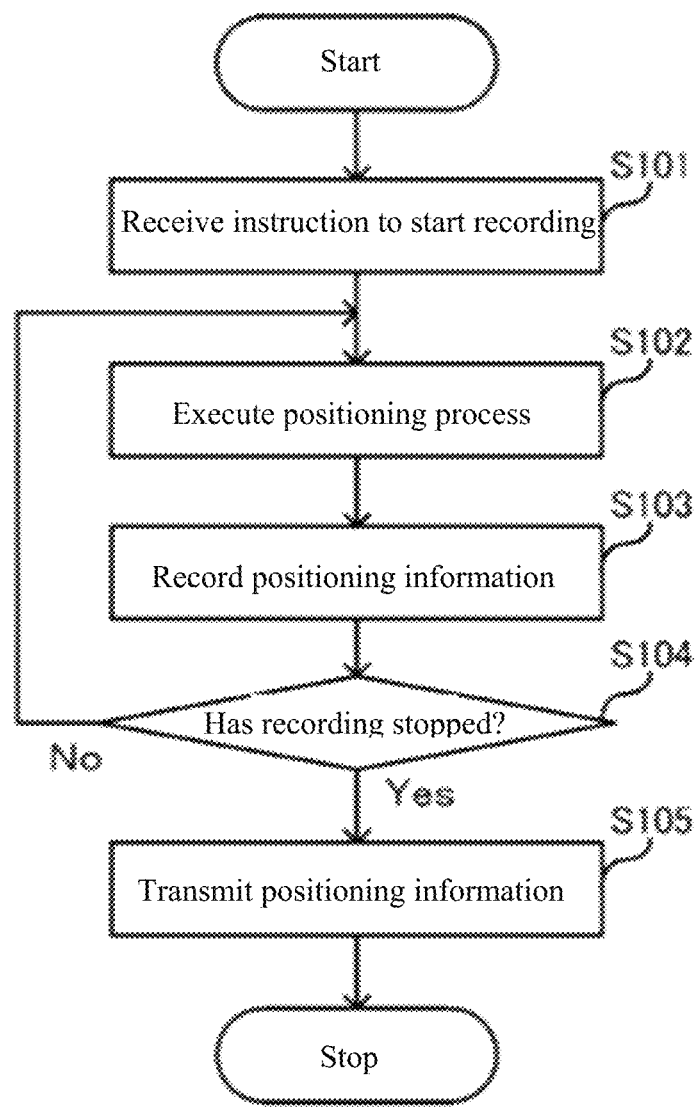
FIG. 4 is a flowchart illustrating one example of a process in a controller.

The process illustrated in FIG. 4, for example, can be implemented by making the control unit 310 execute a predetermined program stored in the storage unit 350 and by controlling each component in the controller 301.

In step S101, the control unit 310 can receive an instruction to start recording the positioning information via the operation unit 330. Then the process can proceed to step S102.

In step S102, the control unit 310 can control the positioning process so as to be executed in the controller 301. The details of the positioning process can be as described previously. Then the process can proceed to step S103.

In step S103, the control unit 310 can store the positioning information acquired by the positioning process of step S102 in the storage unit 350. The positioning information, for example, can include location information of the controller 301 and time information of the positioning. Then the process can proceed to step S104.

In step S104, the control unit 310 can determine whether an instruction has been received to stop recording the positioning information via the operation unit 330. When an instruction to stop has been received (Yes), the process can proceed to step S105. When an instruction to stop has not been received (No), the process can proceed to step S102.

That is, until an instruction to stop the recording is received from the user, execution of the positioning process and the process for storing the positioning information can be repeated in steps S102 and S103. The positioning process can be executed at a predetermined time (for example, every 10 seconds, or every second), and can be executed each time an instruction is received from the user.

Figure 5:
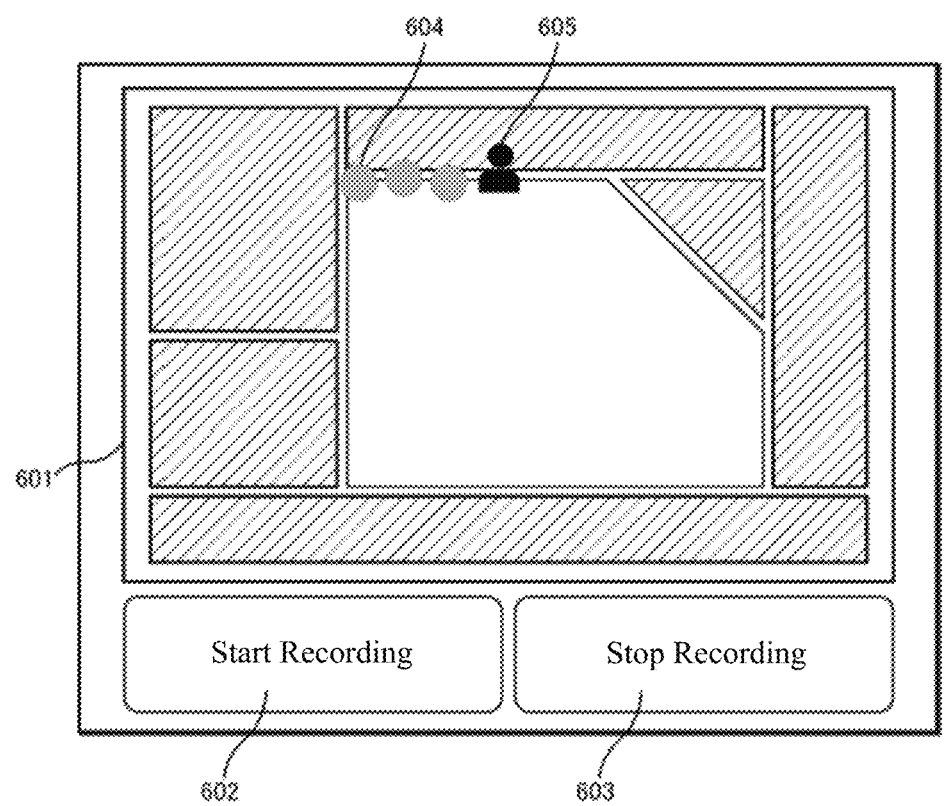
FIG. 5 is a conceptual diagram illustrating one example of a screen displayed on a display unit of a controller.

Here, the process from step S101 to S104 above is described in detail with reference to FIG. 5. The figure illustrates an example of the screen displayed on the display unit 320 of the controller 301. A map 601, a start recording button 602, and a stop recording button 603 are displayed on the screen. Furthermore, an icon 604 and an icon 605 relating to the positioning location is displayed on the map 601.

When a user presses the start recording button 602, the control unit 310 can receive an instruction to start recording the positioning information in step S101. When recording of the positioning information is started in step S103, the positioning process can be executed using the controller 301, and the icon 604 can be displayed at a location on the map 601 corresponding to the recorded positioning location.

Thereafter, an icon can be displayed at a location on the map 601 corresponding to the positioning location is displayed by the controller 301 every time the positioning information is recorded in step S103. For example, when the user moves while holding the controller 301, the positioning location of the controller 301 can also move. The icon can also move and can be sequentially displayed according to the movement of this positioning location. The icon 605 is displayed at the current location of the controller 301 on the map 601. The positioning information can be continually recorded until an instruction to stop the recording is received in step S104 by the user pressing the stop recording button 603. In the example of FIG. 5, the icon 604 illustrating the recorded location of the positioning information is circular, and the icon 605 illustrating the current location is in the shape of a person. However, the shape of the icon is not limited to these, and any shape can be used.

Figure 6:
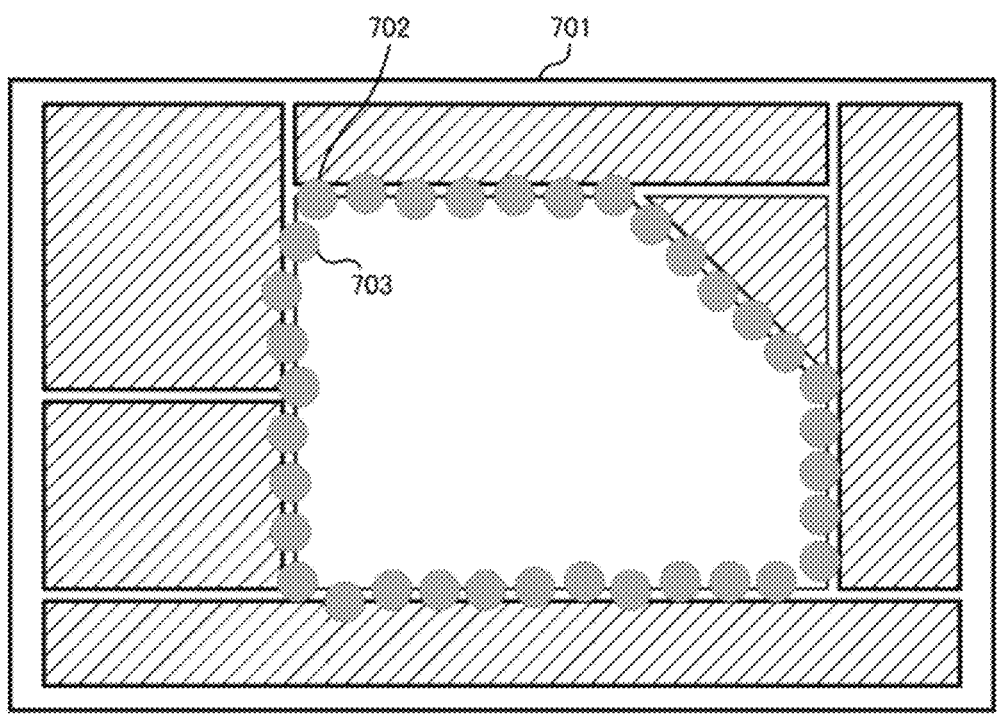
FIG. 6 is a conceptual diagram for describing an example of the location identified by the positioning process.

FIG. 6 illustrates an example of the map displayed on the display unit 320 when an instruction is received to stop recording the positioning information in step S104 of FIG. 4, An icon is displayed respectively at a location on a map 701 corresponding to a plurality of positioning locations recorded from the start of recording until stopped. An icon 702 illustrates a location (first site) where recording of the positioning information is started. An icon 703 illustrates a location where the recording of positioning information is stopped. For example, when the user holds the controller 301 and walks in a clockwise direction around the white painted region in the center of FIG. 6, such a screen can be displayed.

The positioning information stored in the storage unit 350 as described above illustrates the trajectory (movement log) where the controller 301 is moved, and the movement trajectory information is referred to as movement trajectory information in the following description. The movement trajectory information can include information about one or a plurality of locations.

Returning to the description of FIG. 4. In step S105, the control unit 310 can transmit positioning information stored in the storage unit 350 in step S103, that is, the movement trajectory information, to the UAV 101. As described above, the process illustrated in FIG. 4 can be stopped.

The movement trajectory information can be information used for identifying the flight range and flight path in a process to be described later. For example, the flight range or the flight path can be identified by performing an offset correction to be described later, on a location indicated by the movement trajectory information.

Three modified examples relating to the setting method of the movement trajectory information is described below.

Figure 7:
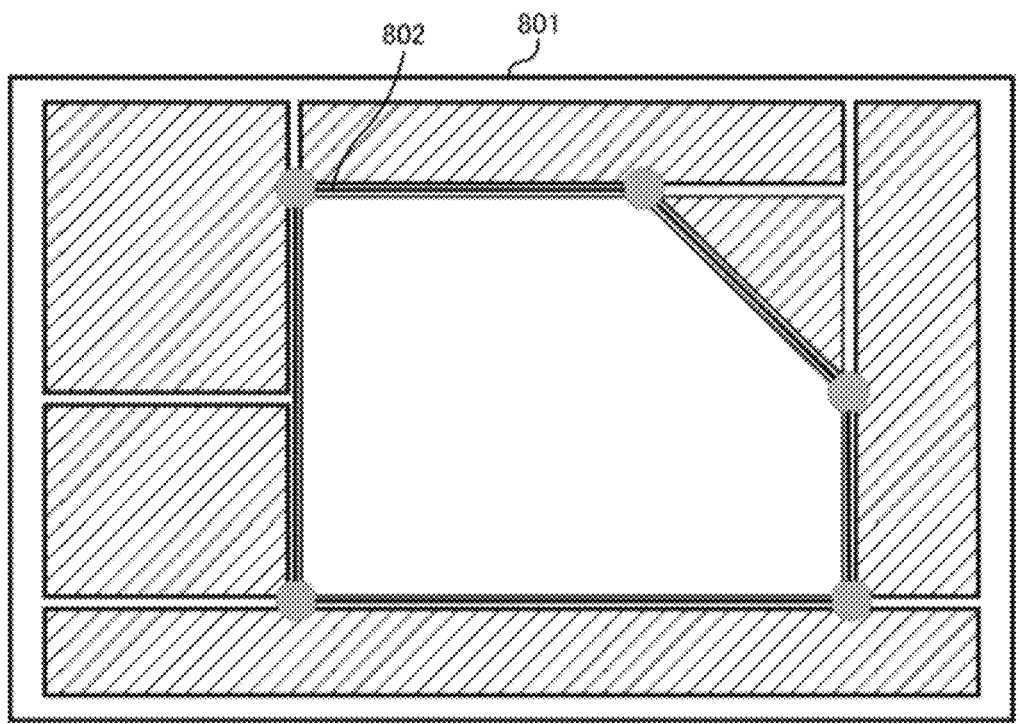
FIG. 7 is a conceptual diagram for describing one example of the movement trajectory information.

The first modified example is described with reference to FIG. 6 and FIG. 7. In this modified example, approximation processing can be performed at a plurality of locations. In the example illustrated in FIG. 6, the plurality of locations obtained by the positioning process can be discretely distributed. In the present modified example, the control unit 310 can carry out the approximation processing for the movement trajectory indicated by the plurality of positioning locations illustrated in FIG. 6, and can convert the movement trajectory, for example, to a shape such as a polygon 802 as illustrated in FIG. 7. The shape obtained by the approximation processing can be a circle or another shape in addition to a polygon. Any method can be used as means for executing the approximation processing. An example of the approximation processing is disclosed in Boris Aronov, et al, "Polyline Fitting of Planar Points under Min-Sum Criteria", International Journal of Computational Geometry and Applications, 16 (2-3), 2006, pp. 97-116.

The control unit 310, in step S105 of FIG. 4, can transmit information of the location on the outer periphery in an approximate shape such as a polygon to the UAV 101 as the movement trajectory information. The approximation processing can also be executed by the UAV 101 rather than the controller 301.

The second modified example is described with reference to FIG. 8. In this modified example, the control unit 310 can record the positioning information at a timing corresponding to the instruction of the user, and can set a shape, whose vertex is the location indicated by the recorded positioning information, as the movement trajectory.

Figure 8:
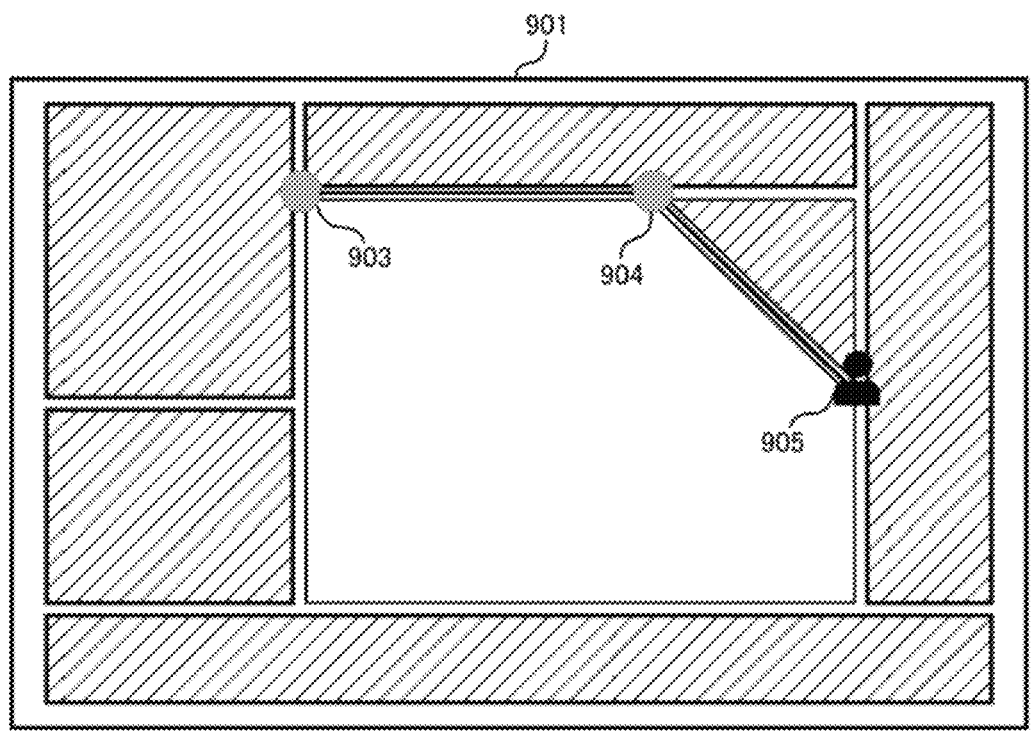
FIG. 8 is a conceptual diagram for describing one example of the setting method of the movement trajectory information.

In FIG. 8, an icon 903 and an icon 904 can indicate a location indicated by the positioning information recorded at a timing corresponding to a user's instructions. An icon 905 can indicate the current location of the user. When instructed by a user to stop recording, a polygon having a vertex at each location indicated by the already recorded positioning information can be formed. The location information on the outer periphery of the polygon can be transmitted from the controller 301 to the UAV 101 as the movement trajectory information.

The third modified example is described with reference to FIG. 9 to FIG. 11. In this modified example, the control unit 310, according to a user's instruction, can change the location indicated by the movement trajectory information set once.

Figure 9:
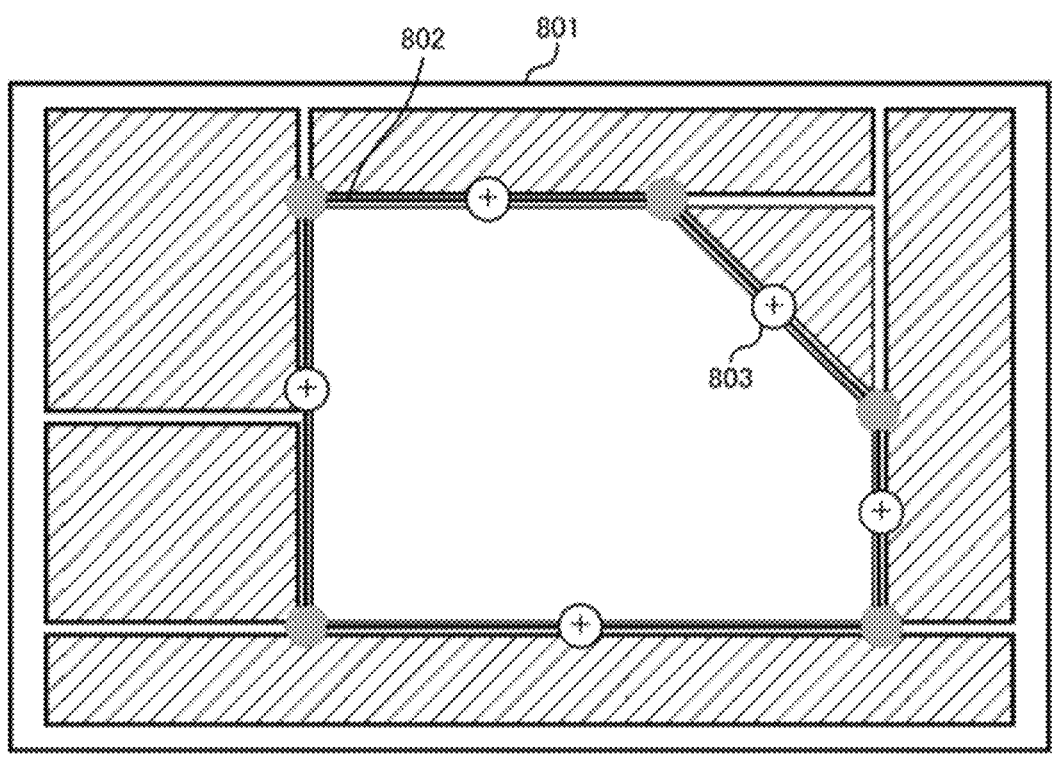
FIG. 9 is a conceptual diagram for describing one example of the setting method of the movement trajectory information.
Figure 10:
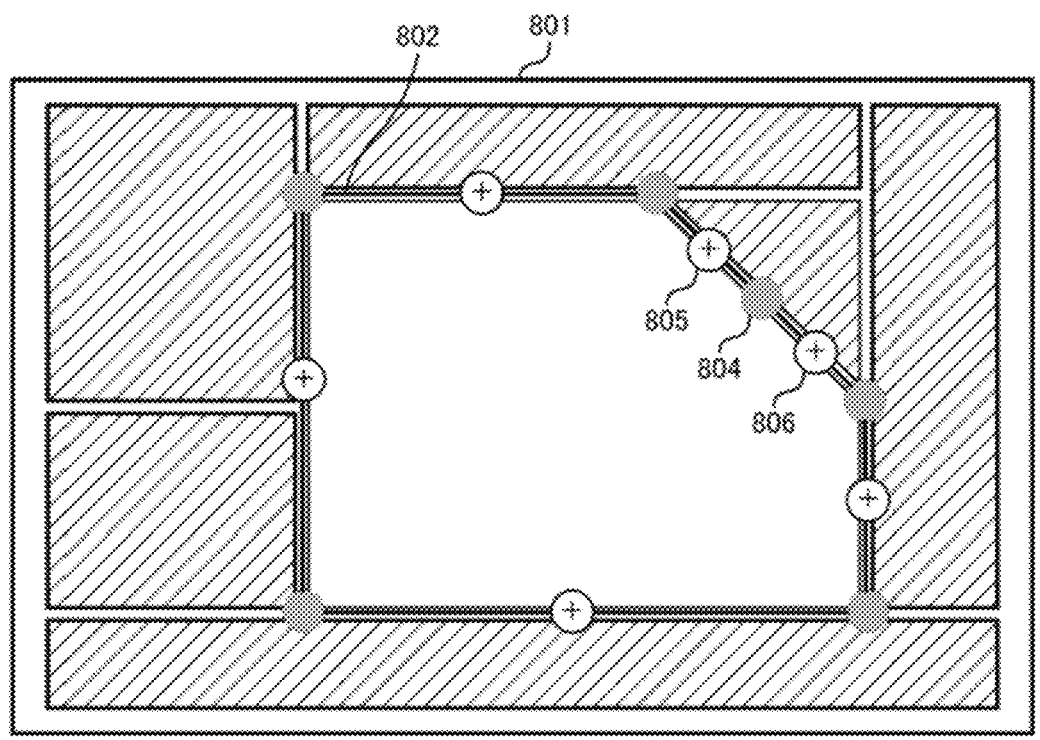
FIG. 10 is a conceptual diagram for describing one example of the setting method of the movement trajectory information.

The map 801 and the polygon 802 illustrated in FIG. 7 are illustrated in FIG. 9. An icon indicated by a "+" mark is displayed between each vertex on the polygon 802 illustrating the movement trajectory. For example, when the icon 803 indicated by the "+" mark is tapped by the user, as illustrated in FIG. 10, a new icon 805 and 806 can be displayed on both sides of the movement trajectory. A new icon 804 can be displayed at the location where the icon 803 was displayed.

Figure 11:
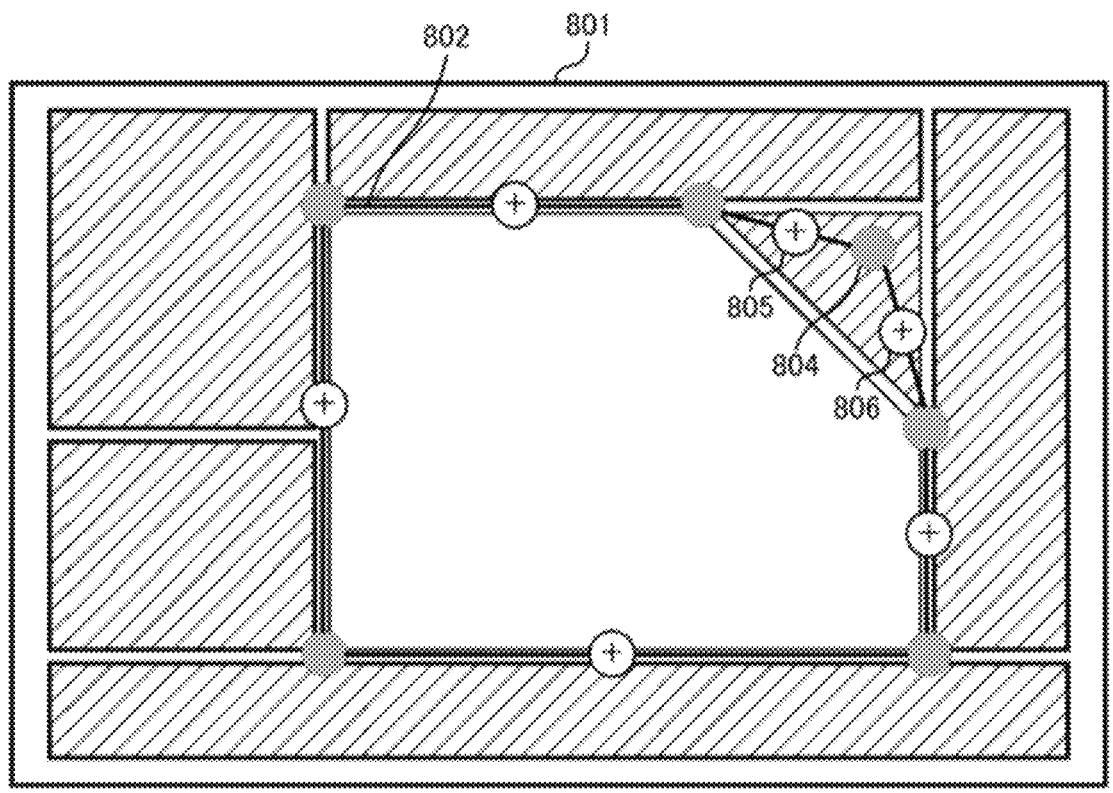
FIG. 11 is a conceptual diagram for describing one example of the setting method of the movement trajectory information.

As illustrated in FIG. 11, a user can change the shape of the movement trajectory by dragging the icon 804. The user can change the shape of the movement trajectory also by dragging other vertices. The location information of the movement trajectory where the shape was changed can be transmitted from the controller 301 to the UAV 101 as the movement trajectory information.

Figure 12:
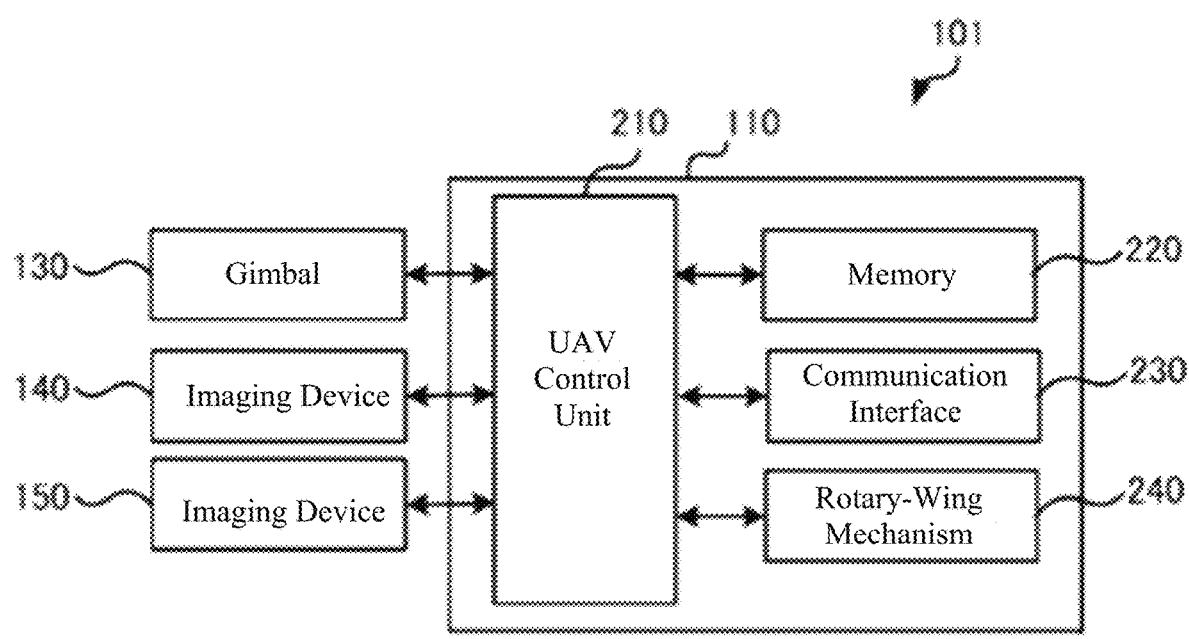
FIG. 12 is a block diagram illustrating one example of the hardware configuration an unmanned aerial vehicle.

The hardware configuration is described with reference to FIG. 12. The UAV body of the UAV 101 can include the hardware configuration. The UAV body can include a UAV control unit 210, a memory 220, a communication interface 230, and a rotary-vying mechanism 240 as the main components.

The UAV control unit 210 can control the operation of various components provided in the UAV 101, and furthermore, can control the execution of various processes. The UAV control unit 210, for example, can include a CPU and a memory.

The UAV control unit 210 can implement various functions by developing and executing the program stored in the memory 220 and by controlling the operation of various components provided in the UAV control unit 210. The functions implemented by be UAV control unit 210 is described later. Furthermore, the process by the UAV control unit 210 can be controlled according to a command received from an external device via the communication interface 230.

The memory 220 can store a program for carrying out control of the entire UAV. The memory 220 can store various log information for the UAV 101, and various data and information such as image data imaged by the imaging device 140 and the camera 150. A computer readable recording medium can be used as the memory. For example, flash memory such as SRAM, DRAM, EEPROM, and USB memory can be used. The memory 220 can also be removed from the UAV 101.

The communication interface 230 can be an interface for communicating with an external unit. The communication interface 230, for example, can receive an instruction from the remote controller terminal via wireless communication, and can transmit various data and information stored in the memory of the UAV 101. The communication interface 230 can also receive a signal from the GNSS positioning system.

The rotary-wing mechanism 240 can be a mechanism for rotating the plurality of rotary wings 120. The rotary-wing mechanism 240 can be configured to include a plurality of rotary wings 120 and a plurality of drive motors.

The UAV 101 can have various sensors such as barometer, laser, acceleration, and gyro sensors. The UAV 101 can include another device, mechanism, and the like.

The function implemented by the process control of the UAV control unit 210 is described with reference to FIG. 13. The UAV control unit 210 can include a flight control unit 211, a transmitter and receiver 212, a positioning processing unit 213, a difference calculating unit 214, a flight control information setting unit 215, and a database 216 as the main components. For example, these functions can be implemented by making the UAV control unit 210 develop and execute the program stored in the memory 220 and by controlling the operation of various components provided in the UAV 101. At least one part of the above-described functions can be implemented by operation of various control circuitry and hardware without executing the program. The UAV control unit 210 can implement other various functions provided in a general unmanned aerial vehicle, but for convenience, a description is omitted here.

The database 216 can store various information such as information necessary for the processing executed in the UAV 101, and information generated by the processing.

The flight control unit 211 can control flight of the UAV 101 by controlling the operation such as the rotary-wing mechanism 240 based on a signal received from outside the UAV 101 and information stored in the database 216. When flight range or the path information, which is described later, is stored in the database 216, the flight control unit 211 can control flight of the UAV 101 based on the flight range or the path information.

The transmitter and receiver 212 can transmit information and signals to, and receive information and signals from, an external device. For example, the transmitter and receiver 212 can receive positioning information (location information) of the controller 301 transmitted from the controller 301, and a signal for controlling the flight. That is, the transmitter and receiver 212 can function as the acquiring unit of the location information. The transmitter and receiver 212 can transmit image data imaged by the imaging device 140 and the camera 150 to the outside.

Location information (first location information) obtained based on the positioning process of the controller 301 located at some site (the first site) be included in the location information acquired by the transmitter and receiver 212. Location information (third location information) such as the previously described movement trajectory information and the like obtained based on the positioning process of the controller 301 after moving can be included in the location information acquired by the transmitter and receiver 212.

The positioning processing unit 213 can identify the location of the UAV 101 (for example, latitude and longitude) using the positioning process. The positioning processing unit 213 can execute any method of the positioning process.

For example, the positioning processing unit 213 can identify the location of the UAV 101 by executing the positioning process based on a signal from the GNSS satellite received via the transmitter and receiver 212. The positioning processing unit 213 can identify the altitude of the location of the UAV 101 according to the measurement results of the barometer of the UAV 101. That is, the positioning processing unit 213 can function as the acquiring unit for acquiring the location information (second location information) of the UAV 101. The positioning process using the positioning processing unit 213 can be executed at a preset timing (for example, every 10 seconds), or according to the instructions of a user.

The difference calculating unit 214 can calculate or identify the difference information between the location indicated by the location information (first location information) of the controller 301 acquired by the transmitter and receiver 212, and the location indicated by the location information (second location information) of the UAV 101 acquired by the positioning processing unit 213. In other words, the difference calculating unit 214 can identify the offset of location of the UAV 101 with respect to the location of the controller 301. The difference information can include information of the distance between locations and the direction of the relationship of locations. The difference information can include difference information of latitude and longitude between locations. The difference information can include vector information (information including the distance and direction) illustrating the relationship of the two locations. The difference calculating unit 214 can store the calculated difference information in the database 216.

The difference calculating unit 214, for example, can calculate or identify the difference information between the locations respectively acquired by both of the positioning processes located at substantially the same site (first site), when a user performs the positioning while holding both the controller 301 and the UAV 101. If the method of positioning and accuracy of positioning for the controller 301 and the UAV 101 differ, even if both are located at the same site, offset can occur between the respective locations. For example, in the UAV 101, the positioning process can be executed by a signal from the GNSS satellite, and in the controller 301, positioning can be conducted using autonomous navigation. Offset can occur in such a case.

As described with reference to FIG. 4 to FIG. 6, since the movement trajectory information of the above-described controller 301 can be log information obtained by positioning while moving the controller 301 on the actual route, the location of the controller 301 can be illustrated with high accuracy. By adding offset to the movement trajectory information, the location information when the UAV 101 is moving on the route can be calculated with high accuracy.

Figure 14:
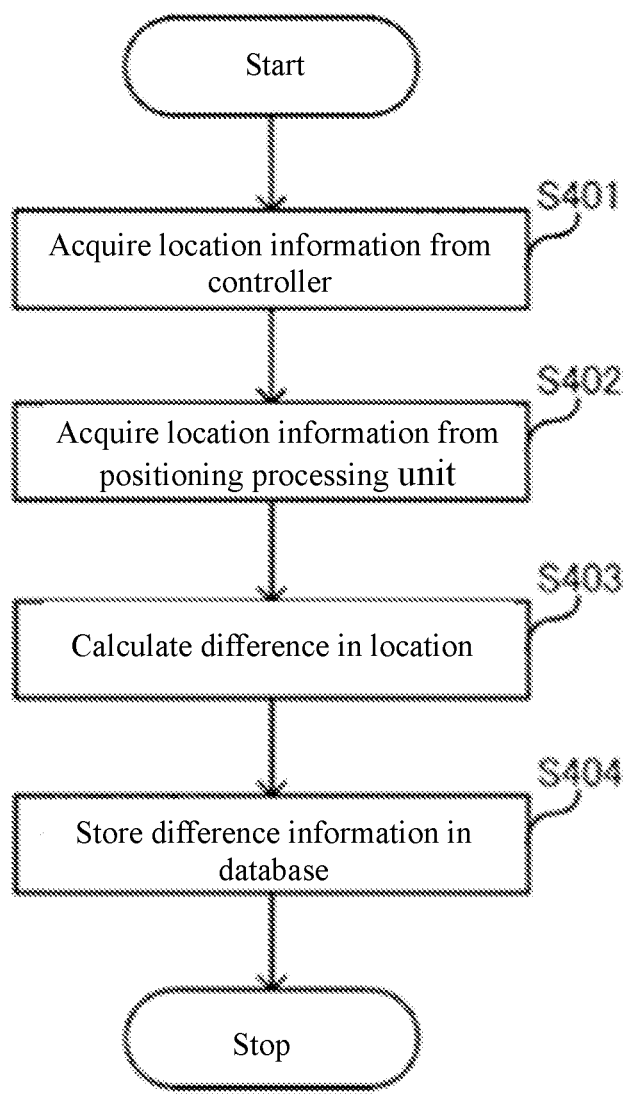
FIG. 14 is a flowchart illustrating one example of the processing in the unmanned aerial vehicle.

One example of the process flow for calculating the difference information using the difference calculating unit 214 of the UAV control unit 210 is described with reference to FIG. 14. This process can be started according to an instruction from a user to the controller 301 when the controller 301 and the UAV 101 are disposed at the same site (first site).

In step S401, the difference calculating unit 214 can acquire the location information (first location information) of the controller 301 received (acquired) by the transmitter and receiver 212. The first location information can be the location information acquired by executing the positioning process using the controller 301 when the controller 301 is disposed at the first location. Then, the process can proceed to step S402.

In step S402, the difference calculating unit 214 can acquire the location information (second location information) of the UAV 101 acquired by the positioning processing unit 213. The second location information can be the location information acquired by the positioning process using the UAV 101 when the UAV 101 is disposed at the first location. Then, the process can proceed to step S403.

In step S403, the difference calculating unit 214 can acquire the difference information between the location indicated by the first location information acquired in step S401, and the location indicated by the second location information acquired in step S402. Then, the process can proceed to step S404.

OFFSET[lat]=UAV[lat]−MOBILE[lat]

OFFSET[lng]=UAV[lng]−MOBILE[lng]

An example of acquiring the difference information in step S403 is described. The latitude of the location indicated by the first location information is MOBILE[lat], and the longitude is MOBILE[lng]. The latitude of the location indicated by the second location information is UAV[lat], and the longitude is UAV[lng]. At this time, the difference in latitude (OFFSET[lat]) and the difference in longitude (OFFSET[lng]) between the location indicated by the first location information and the location indicated by the second location information is as follows.

OFFSET[lat]=UAV[lat]−MOBILE[lat]

OFFSET[lng]=UAV[lng]−MOBILE[lng]

The formulas described above identify the offset of the location of the UAV 101 with respect to the location of the controller 301 as the difference information.

In step S404, the difference calculating unit 214 can store the difference information calculated in step S403 in the database 216. The difference calculating unit 214, for example, can store the difference of the OFFSET[lat] of the latitude and the difference OFFSET[lng] of the longitude in the database 216 as the difference information. Thereafter, the process illustrated in FIG. 14 can be stopped.

Figure 13:
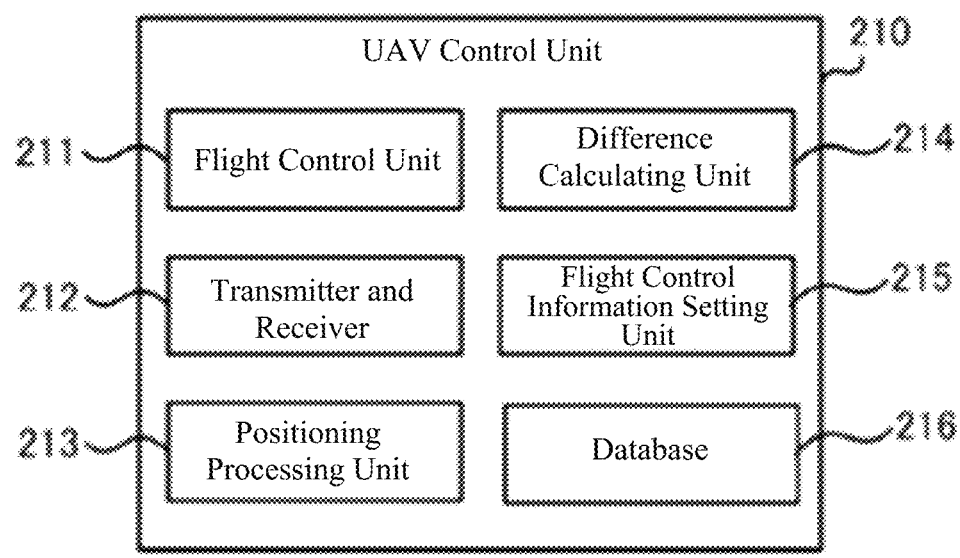
FIG. 13 is a block diagram illustrating one example of a functional configuration of a UAV control unit for an unmanned aerial vehicle.

Returning to the description of FIG. 13. The flight control information setting unit 215 can set the information of the flight range or the path of the UAV 101 based on the difference information calculated by the difference calculating unit 214 and the movement trajectory information (third location information) acquired by the transmitter and receiver 212.

For example, the flight control information setting unit 215 can set the information of the flight range or path according to the location information calculated based on the movement trajectory information and the difference information of the controller 301. The information of the flight range or path can be indicated by the latitude and longitude, and can also be indicated by other coordinate information for illustrating the location.

UAV'[lat]=MOBILE'[lat]+OFFSET[lat]

UAV'[lng]=MOBILE'[lng]+OFFSET[lng]

When using the difference information calculated by the example described with reference to FIG. 14, the latitude (UAV'[lat]) and the longitude (UAV'[lng]) of the location calculated from the latitude (MOBILE'[lat]) and the longitude (MOBILE'[lng]) of the location indicated by the movement trajectory information is as follows.

UAV'[lat]=MOBILE'[lat]+OFFSET[lat]

UAV'[lng]=MOBILE'[lng]+OFFSET[lng]

The process for calculating the new location from the location indicated by the movement trajectory information by adding the difference information (offset) to the movement trajectory information as described in the formulas above is called the offset correction.

The flight control information setting unit 215 can set the boundary information of the flight range for the UAV 101 by connecting a plurality of locations indicated by UAV'[lat] and UAV'[lng]. Alternatively, the flight control information setting unit 215 can set the information of the path for the UAV 101 by connecting a plurality of locations indicated by UAV'[lat] and UAV'[lng].

The flight control information setting unit 215 can set the flight range or the path for the UAV 101 inside a region surrounded by a line formed by connecting locations indicated by UAV'[lat] and UAV'[lng]. For example, the boundary or path of the flight range can be set at a location only inside a predetermined distance (for example, 2 m) from the line connecting the locations indicated by the UAV'[lat] and the UAV'[lng].

The flight control information setting unit 215 can also set the location of the outer periphery of the polygon output by carrying out the approximation processing for the locations indicated by UAV'[lat] and UAV'[lng], as the flight range or path. The flight control information setting unit 215 can also set the shape location as the flight range or path by outputting any shape such as a circular, elliptical, or irregular shape by the approximation processing.

The flight control information setting unit 215 can also set the flight range (virtual fence) or path for the UAV 101 inside a region of a polygon (or any shape such as a circular, elliptical, or irregular shape) output by carrying out the approximation processing for the locations indicated by UAV'[lat] and UAV'[lng].

The flight control information setting unit 215 can store the information for the set flight range or path in the database 216. The flight control unit 211 can control the flight of the UAV 101 based on the location information acquired from the flight range or path information and the positioning processing unit 213.

For example, in the case of manual flight, the flight control unit 211 can control the flight of the UAV 101 so that the location of the UAV 101 indicated by the location information acquired from the positioning processing unit 213 does not exceed a set flight range. In the case of automatic flight, the flight control unit 211 can control the flight of the UAV 101 so that its own location indicated by the location information acquired from the positioning processing unit 213 can be located on the set path.

The controller 301 and the UAV 101 can be located at the same site, a positioning process can be carried out for both, and the difference information of the location of both, that is, the offset can be calculated. The user can move the controller 301 on the virtual fence or path to be set (for example, walking while holding the controller 301), to obtain the movement trajectory information. The movement trajectory information can be log information positioned while moving the controller 301 on the virtual path or fence to be set. Thus, the positioning location can be indicated with high accuracy. By adding the offset to the movement trajectory information, the virtual fence or path can be set with high accuracy.

The location information can be acquired while moving the controller 301, and the virtual fence or path can be set based on the location information. Thus, there is no problem of inaccuracy in the virtual fence caused by the difficulty of flight operation of the UAV, which can occur when using a method for setting a virtual fence or the like based on the flight log of the UAV 101.

As a modified example, the process by the difference calculating unit 214 and the flight control information setting unit 215 executed in the UAV 101 as described above, can be executed in an external information processing device such as in a server device or the like. At this time, the first location information, second location information, and third location information necessary for processing can be transmitted to the information processing device from the UAV 101 and the controller 301. That is, the information processing device can include an acquiring unit of the difference information, and an acquiring unit of the third location information, and can include a setting unit for setting the flight range or the path information based on the acquired difference information and the third location information. Furthermore, information of the flight range or the path set as a result of the processing by the information processing device can be transmitted to the UAV 101. The UAV 101 can control its own flight based on the received flight range or path information.

Figure 15:
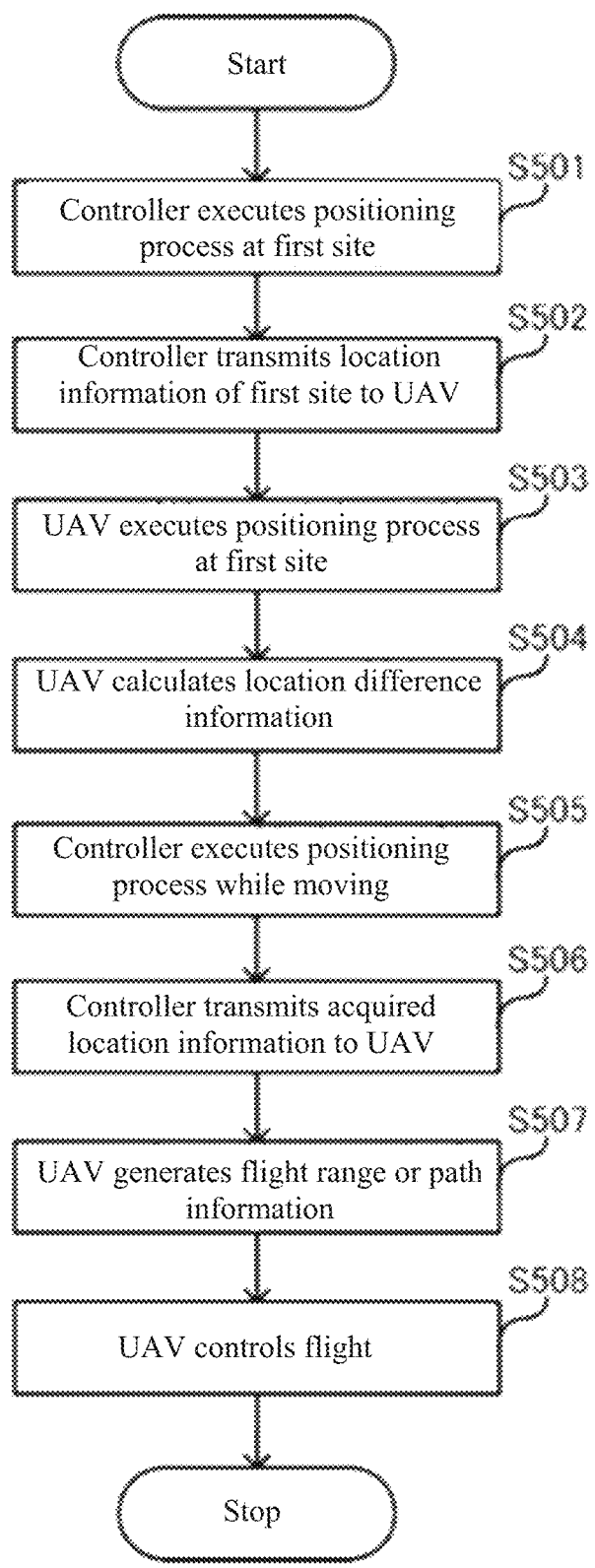
FIG. 15 is a flowchart illustrating one example of the processing in the unmanned aerial vehicle control system.

An example of the process flow until the flight range or the path information is generated and the flight is controlled based on that information, in the unmanned aerial vehicle control system 100 (UAV 101 and controller 301), is described with reference to FIG. 15. This process can start when the controller 301 and the UAV 101 are disposed at the same site (first site). Since the process has been described in detail already, a detailed description thereof is omitted here.

In step S501, the controller 301 can execute the positioning process using the positioning processing unit 311 according to the instructions of a user, and the location information (first location information) of the controller 301 can be acquired.

In step S502, the controller 301 can transmit the first location information acquired in step S501 to the UAV 101.

In step S503, the UAV 101 can execute the positioning process using the positioning processing unit 213 according to the instructions of a user, and the location information (second location information) of the UAV 101 can be acquired.

In step S504, the UAV 101 can identify the difference between the location indicated by the first location information acquired from the controller 301 and the location indicated by the second location information acquired by the positioning process of the UAV 101 as the difference information. The UAV 101 can store the identified difference information in the database 216.

In step S505, when the controller 301 is carried by a user or a transporting body (for example, an automobile) or the like, it can move from the first site. For example, while carrying the controller 301, the user can move along the virtual fence or path to be set by walking or the like. While moving, the controller 301 can the positioning process until an instruction to stop is received at a preset timing (for example, every 10 seconds) or according to the instructions of a user, and the location information (third location information) can be acquired. The path can be set by using a map displayed on the display unit 320. In this case, the third location information can correspond to the path.

In step S506, the controller 301 can transmit the third location information acquired in step S505 to the UAV 101.

In step S507, the UAV 101 can generate the flight range or path information based on the offset as the difference information identified in step S504, and the third location information acquired from the controller 301 in step S506. The generating method of the flight range or path information is as was already described.

In step S508, the UAV 101, after a flight instruction is received, can control the flight based on the flight range or path information generated in step S507.

The present disclosure is not limited to the above embodiments, and various other modifications can be implemented within the scope not deviating from the gist of the present disclosure. That is, the foregoing embodiments are merely illustrative in all respects and are not to be construed as limiting, and various modified examples can be used.

In a modified example, the UAV 101 in the unmanned aerial vehicle control system 100 of the above embodiments can be replaced by another aerial vehicle. For example, the UAV 101 can be a manned aerial vehicle. At this time, the flight range and the path during automatic flight of the manned aerial vehicle can be set by the process described above.

In another modified example, the UAV 101 in the unmanned aerial vehicle control system 100 can be replaced by another moving object. The moving object can include, for example, other aerial vehicles moving in the air, a vehicle moving on the ground, a ship moving on the water, and the like. At this time, the moving range and moving path can be set by the same process as when setting the flight range illustrating the moving range and the flight path illustrating the moving path of the UAV 101 described above.

DESCRIPTION OF REFERENCE NUMERALS

100 Unmanned aerial vehicle control system
101 UAV
110 UAV body
120 Rotary wing
130 Gimbal
140 Imaging device
150 Camera
210 UAV control unit
211 Flight control unit
212 Transmitter and receiver
213 Positioning processing unit
214 Difference calculating unit
215 Flight control information setting unit
216 Database
220 Memory
230 Communication interface
240 Rotary-wing mechanism
301 Controller
310 Control unit
311 Positioning processing unit
312 Location recording unit
313 Transmitter and receiver
314 Database
320 Display unit
330 Operation unit
340 Main body
350 Storage unit
360 Communication unit
370 Sensor

What is claimed is:

1. An information processing device for processing information for a moving object, comprising:
a control circuitry configured to:
acquire, by a first acquisition unit of the moving object, first location information obtained based on a positioning process of a terminal;
acquire, by a second acquisition unit of the moving object, second location information obtained based on a positioning process of the moving object, the moving object and the terminal being located at a same site;
calculate, by a calculating unit of the moving object, difference information between a terminal location indicated by the first location information and a moving-object location indicated by the second location information;
acquire, by a third acquisition unit of the moving object, third location information obtained based on the positioning process of the terminal after the terminal moves; and
set, by a setting unit of the moving object, information of a moving range for the moving object according to information of a target location calculated based on the third location information and the difference information.

2. The information processing device of claim 1, wherein the control circuitry is further configured to control the moving object to not exceed the moving range.

3. The information processing device of claim 1, wherein:
the terminal location is a first terminal location;
the third location information comprises information about a plurality of second terminal locations; and
the control circuitry is further configured to set the information of the moving range according to information for a plurality of target locations calculated based on the information about the plurality of second terminal locations and the difference information.

4. The information processing device of claim 3, wherein the control circuitry is further configured to set information of a moving range boundary by connecting the plurality of target locations.

5. The information processing device of claim 4, wherein the control circuitry is further configured to set information of the moving range so that the moving range is inside a region surrounded by the moving range boundary.

6. The information processing device of claim 1, wherein the positioning process of the terminal differs from the positioning process of the moving object.

7. The information processing device of claim 1, wherein the positioning process of the terminal comprises autonomous navigation.

8. The information processing device of claim 1, wherein the difference information comprises latitude and longitude information.

9. The information processing device of claim 1, wherein the difference information comprises vector information.

10. The information processing device of claim 1, wherein the terminal is a mobile phone, a smartphone, a tablet terminal, a laptop, or a navigation device.

11. The information processing device of claim 1, wherein the positioning process of the moving object is executed according to a user's instructions.

12. The information processing device of claim 1, wherein the third location information comprises location information obtained by the positioning process of the terminal executed at predetermined time intervals.

13. An information processing device for processing information for a moving object, comprising:
a control circuitry configured to:
acquire, by a first acquisition unit of the moving object, first location information obtained based on a positioning process of a terminal;
acquire, by a second acquisition unit of the moving object, second location information obtained based on a positioning process of the moving object, the moving object and the terminal being located at a same site;
calculate, by a calculating unit of the moving object, difference information between a terminal location indicated by the first location information and a moving-object location indicated by the second location information;
acquire, by a third acquisition unit of the moving object, third location information obtained based on the positioning process of the terminal after the terminal moves; and
set, by a setting unit of the moving object, information of a moving path according to information of a target location calculated based on the third location information and the difference information.

14. The information processing device of claim 13, wherein the control circuitry is further configured to control the moving object to move on the moving path.

15. The information processing device of claim 13, wherein:
the terminal location is a first terminal location;
the third location information comprises information about a plurality of second terminal locations; and
the control circuitry is further configured to set the information of the moving path according to information for a plurality of target locations calculated based on the information about the plurality of second terminal locations and the difference information.

16. The information processing device of claim 15, wherein the control circuitry is further configured to set the information of the moving path by connecting the plurality of target locations.

* * * * *